Patented June 15, 1943

2,321,750

UNITED STATES PATENT OFFICE 2,321,750

RESINOUS COMPOSITIONS AND METHOD OF THEIR PRODUCTION

Irvin W. Humphrey, Wilmington, Del., assignor to Hercules Powder Company, Wilmington, Del., a corporation of Delaware No Drawing. Application January 18, 1938, Serial No. 185,513

13 Claims. (Cl. 260—78)

This invention relates to a terpene-maleic anhydride reaction product and to a method for its production, and more specifically to a polymerized terpene-maleic anhydride reaction product and to a method for its production.

Heretofore, it has been known to react maleic anhydride and phellandrene for the production of a crystalline compounds, as disclosed in British Patent No. 300,130 of 1928. Furthermore, it has been known to react maleic anhydride and various unpolymerized terpenes, for example, alpha-terpinene, terpinolene, pinene, cineol, as well as various abietyl compounds, such as alkyl esters of abietic acid.

In accordance with this invention, I have found that a resinous composition of superior properties is produced by reacting maleic anhydride, or equivalently maleic acid, with a polymerized terpene, often known as dipolymer. The resinous composition so produced is a rather dark, amorphous solid at room temperatures and of high stability. It can be converted into a superior thermoplastic material. It comprises a resinous, high molar weight dicarboxylic acid.

Polymerized terpene, or dipolymer, is a product consisting of polymerized terpene hydrocarbons, obtained by polymerizing turpentine, dipentene, or pine oil, and usually is composed largely of the dimer $(C_{10}H_{16})_2$, with substantial proportions of higher polymers $(C_{10}H_{16})_x$. Polymerized terpene may be made by known methods, e. g., subjecting the terpene to prolonged heat or by putting the terpene in contact with a polymerizing catalyst, with or without application of external heat. Polymerized terpenes may be obtained by polymerizing pinene, dipentene, terpinene, terpinoline, various other terpenes, a terpene cut or fraction, turpentine, or pine oil, by treatment with sulfuric acid, phosphoric acid, fuller's earth, boron trifluoride, and amphoteric metal chlorides, such as zinc chloride or aluminum chloride, preferably the latter, etc.

The polymerized terpene produced may be fractionated into several cuts, if desired. Such fractionation may be made according to viscosity, density, or boiling range of the distillate, for example, into a diterpene cut, a volatile cut consisting of higher polymerized terpenes, and a residue of even higher polymerized terpenes. Fractionation of the polymerized terpene may be conducted under atmospheric or reduced pressure, e. g. fractions may be collected under atmospheric pressure distillation at about 335–360° C., 360–375° C., 375–400° C.

Any of these, or other fractions or cuts, or mixtures thereof, may separately be reacted with maleic anhydride in accordance with this invention.

In proceeding in accordance with this invention, for the production of the resinous composition, for example, 200 g. of polymerized terpene were heated with 50 g. of maleic anhydride at about 170° C. for a period of about 20 hours. The product, after cooling, was dissolved in naphtha, the naphtha solution of the resin washed with water, the naphtha removed by distillation, then heated to 190° C. under 10 mm. pressure, leaving 170 g. of a semi-solid resin more viscous than the dipolymer. On heating this resin to 300° C. under reduced pressures, about 80% of it distilled, the distillate having a refractive index 1.5279, iodine value 146. If desired, the polymerized terpene-maleic anhydride resin may be variously separated into cuts or fractions by distillation thereof, preferably in vacuo, collecting separately successive portions of the distillate, and collecting the undistilled residue. The properties of these fractions and residue will vary somewhat in physical properties and will variously be adapted to use in thermoplastic materials.

As a further example of the process and product in accordance with this invention, 100 parts by weight of polymerized terpene (produced by polymerizing terpinene with fuller's earth) and 40 parts by weight of maleic anhydride, were heated at about 200° C. for 3 hours under an air-cooled reflux condenser. After cooling, the mixture was washed several times with hot water, to remove unreacted maleic anhydride, then dissolved in benzene, the benzene layer dried with anhydrous sodium sulfate, and the benzene removed by distillation. The resin produced was dark, adhesive, and semi-solid.

The polymerized terpene-maleic anhydride acidic resins produced in accordance with this invention are particularly useful in the preparation of esters of a non-acidic, resinous nature, particularly where the esterifying agent is a polyhydric alcohol, such as a substituted or unsubstituted glycol, a polyglycol, glycerol, or the like. In particular, the various glycol esters are useful resins in that they possess great flexibility, which property is imparted to lacquer or varnish compositions in which they may be used.

Where, in the specification and claims hereof, I use the term maleic anhydride, I mean to include, as the equivalent thereof, maleic acid, since the latter is capable of substitution for the former in my invention.

It will be understood that the procedures, times, temperatures, etc., described herein in the examples are for illustrative purposes only and that I contemplate variations thereof as within the scope of my invention. It will also be appreciated that maleic anhydride or maleic acid may be used equivalently and directly, or may be formed as a preliminary step, for example, by the use of fumaric acid, which is converted into maleic anhydride by heat.

This application forms a continuation-in-part of my application, Serial No. 22,264, filed May 18, 1935, now Patent No. 2,139,588, for Esters of hydrogenated abietyl alcohol and method of producing.

What I claim and desire to protect by Letters Patent is:

1. The product of the reaction of maleic anhydride and a polymerized terpene composed largely of a diterpene of formula $(C_{10}H_{16})_2$.

2. The resinous dicarboxylic acid product of the reaction of maleic anhydride and a polymerized terpene composed largely diterpene of formula $(C_{10}H_{16})_2$.

3. The method of producing a resinous composition which includes reacting maleic anhydride and a polymerized terpene composed largely of a diterpene of formula $(C_{10}H_{16})_2$.

4. The method of producing a resinous composition which includes heating maleic anhydride and an excess of a polymerized terpene composed largely of a diterpene of formula $(C_{10}H_{16})_2$ at a temperature which will facilitate reaction.

5. The method of producing a resinous composition which includes heating maleic anhydride and an excess of a polymerized terpene composed largely of a diterpene of formula $(C_{10}H_{16})_2$ at a temperature which will facilitate reaction, removing excess polymerized terpene, and cooling the reaction product.

6. The method of producing a resinous composition which includes admixing maleic anhydride and an excess of a polymerized terpene composed largely of a diterpene of formula $(C_{10}H_{16})_2$ and heating the mixture to a temperature of about 200° C. for a period of about three hours, vaporizing off excess polymerized terpene, and cooling the reaction product.

7. The method of producing a resinous composition which includes heating maleic anhydride and a polymerized terpene composed largely of a diterpene of formula $(C_{10}H_{16})_2$ at a temperature which will facilitate the reaction.

8. The method of producing a resinous composition which includes heating a polymerized terpene composed largely of a diterpene of formula $(C_{10}H_{16})_2$ with maleic acid to effect conversion of maleic acid to maleic anhydride, and continuing the heating to effect reaction between the polymerized terpene and maleic anhydride.

9. The method of producing a resinous composition which includes fractionating a polymerized terpene and reacting maleic anhydride with a fraction of said polymerized terpene composed largely of a diterpene of formula $(C_{10}H_{16})_2$.

10. The method of producing a resinous composition which includes reacting maleic anhydride and a polymerized terpene composed largely of a diterpene of formula $(C_{10}H_{16})_2$ and fractionally distilling the resin so produced.

11. A process which comprises reacting maleic anhydride with a di-terpene having the formula $C_{20}H_{32}$ until there is obtained dibasic acid anhydride having the formula of $C_{24}H_{34}O_3$ and molecular weight of 370.

12. The process which comprises reacting by heating maleic anhydride with a diterpene until there is obtained a resinous acid anhydride, the average molecule of which contains in chemical combination more than one $C_{10}H_{16}$ terpene nucleus to each and every molecule of combined maleic anhydride.

13. Resinous polybasic acid anhydrides obtained from the reaction by heating a diterpene with maleic anhydride and which upon analysis are found to contain more than one $C_{10}H_{16}$ terpene nucleus to each and every molecule of combined maleic anhydride.

IRVIN W. HUMPHREY.